UNITED STATES PATENT OFFICE.

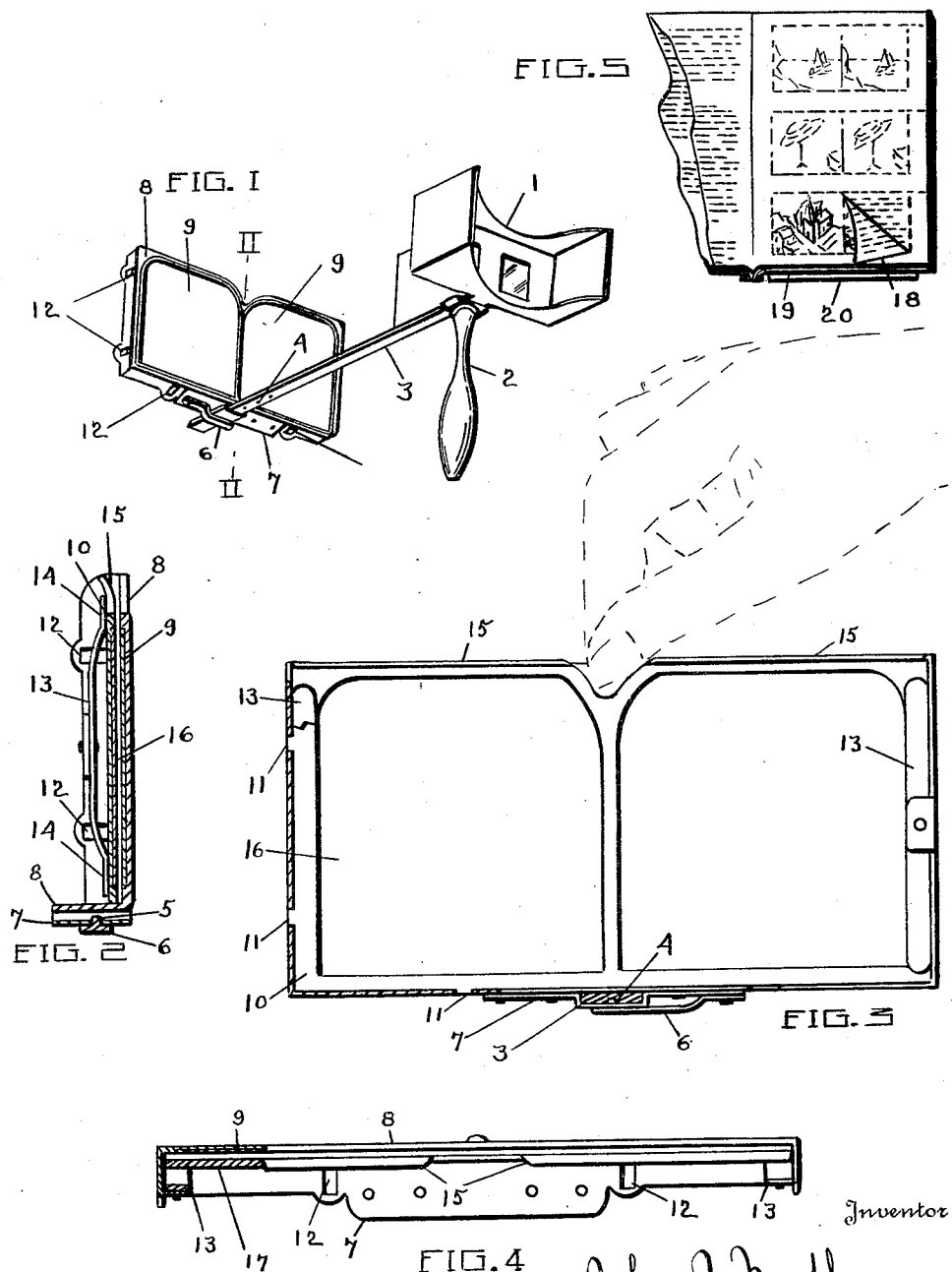

JOHN J. MURPHY, OF TOLEDO, OHIO, ASSIGNOR TO THE AMERICAN CORTESCOPE COMPANY, OF TOLEDO, OHIO.

STEREOSCOPE.

1,121,529. Specification of Letters Patent. Patented Dec. 15, 1914.

Application filed June 8, 1914. Serial No. 843,640.

*To all whom it may concern:*

Be it known that I, JOHN J. MURPHY, a citizen of the United States, residing at Toledo, Lucas county, Ohio, have invented new and useful Stereoscopes, of which the following is a specification.

This invention relates to stereoscopes and more especially to holders for stereoscopic views.

This invention has utility when embodied in a holder for stereoscopic views, even such views when flimsy and unmounted.

Referring to the drawings: Figure 1 is a perspective view of an embodiment of the invention in connection with a stereoscope of the ordinary type; Fig. 2 is a section through the holder of Fig. 1 on the line II—II; Fig. 3 is a back view of the holder of Fig. 1, a portion being broken away; Fig. 4 is a plan view of the holder with a fragment broken away; and Fig. 5 shows a fragment of a periodical or magazine which may have as a part thereof stereoscopic views unmounted and not mounted upon cardboard, but which can be readily used in the holder of this invention.

The stereoscope 1 is provided with the supporting handle 2 and the holder sustaining stem 3. The stem 3 has seat 4 therein which may be engaged by the stud 5 on the spring arm 6 carried by the member 7 on the lower part of the holder proper. The member 7 has central guide portion which will permit sliding over the free end of the stem or supporting member 3 and the projection 5 entering the seat 4 in member 3 insures a firm locking of the holder in position on the stem 3 in the desired position of focus.

Fast with the member 7 is the main holder or frame element 8 providing the front of the holder and which has the windows 9 therein say of celluloid permitting a ready inspection of views inserted into the pocket of the holder.

The completion of the holder pocket is formed by the back member 10 which is provided with tongues 11 coacting with recesses 12 in the member 8. The pair of strap springs or bows 13, one at each end of the holder, are each medially held and the free ends 14 thereof coact with the back element 10 to hold it in position against the rear side of the front element 8 so that in sliding a view into the opening formed by the rearwardly extending portion 15 of the back element 10, such view is fully flattened out and firmly held in such flat position against the pair of openings for the transparency 9 for proper display and view from the stereoscope 1. The back element 10 of Figs. 2, 3, has the translucency 16 therein which may be a ground celluloid. As thus constructed the holder is readily adapted for viewing transparencies or films even unmounted. When the holder is not designed for use in connection with transparencies the back member 17 may be continuous throughout the extent of the back of the holder.

In the use of the device of this disclosure it has merit in permitting most cheap and wide distribution of third dimension knowledge in the ordinary publications for they may include the two eye or stereoscopic views as their illustrations, say as shown in Fig. 5 and design these for cutting out or perforating for ready removal so that the view 18 may be readily placed in the holder and as thus exhibited be inspected with as much satisfaction as in a view mounted on a card, while similarly any unmounted transparency may be viewed with as good results as a mounted transparency. This latter feature has great worth not only as a matter of interest but in connection with the conveyance of information to others, say regarding wares being sold. The salesman instead of being hampered with the articles may convey as full information to a prospect with a pack of unmounted transparencies or unmounted views. Book or magazine 19 containing the views 18 may have a pocket provision 20 in which the detached views may be placed for subsequent use.

What is claimed and it is desired to secure by Letters Patent is:

1. A stereoscopic view holder embodying a pocket having a side provided with yieldable means to actuate the side for flattening the view to be held.

2. A stereoscopic view holder embodying a pocket having a transparent front and opposing means in said pocket for holding a view in said pocket against said front.

3. A stereoscopic view holder embodying a pocket having a translucent back, and an opposing front, said back and front being relatively movable to engage a view therebetween.

4. The combination with a stereoscope, of a holder having opposing view gripping coacting means extending about edges of a view for holding a view in flattened position in a plane for being seen through the stereoscope.

In testimony whereof I affix my signature in the presence of two witnesses.

JOHN J. MURPHY.

Witnesses:
 GEO. E. KIRK,
 C. H. RAUCH.

Copies of this patent may be obtained for five cents each, by addressing the "Commissioner of Patents, Washington, D. C."